G. W. Hubbard,
Sawing Stone.

Nº 13,788.      Patented Nov. 13, 1855.

UNITED STATES PATENT OFFICE.

GEORGE W. HUBBARD, OF MIDDLETOWN, CONNECTICUT.

IMPROVED MARBLE-SAWING MACHINE.

Specification forming part of Letters Patent No. 13,788, dated November 13, 1855.

*To all whom it may concern:*

Be it known that I, GEORGE W. HUBBARD, of Middletown, in the county of Middlesex and State of Connecticut, have invented a new and useful Improvement in Machines for Sawing Marble Blocks in Polygonal Taper Form; and I do hereby declare that the following is a full, clear, and exact description of the same, reference being had to the annexed drawings, making a part of this specification, in which—

Figure 1:
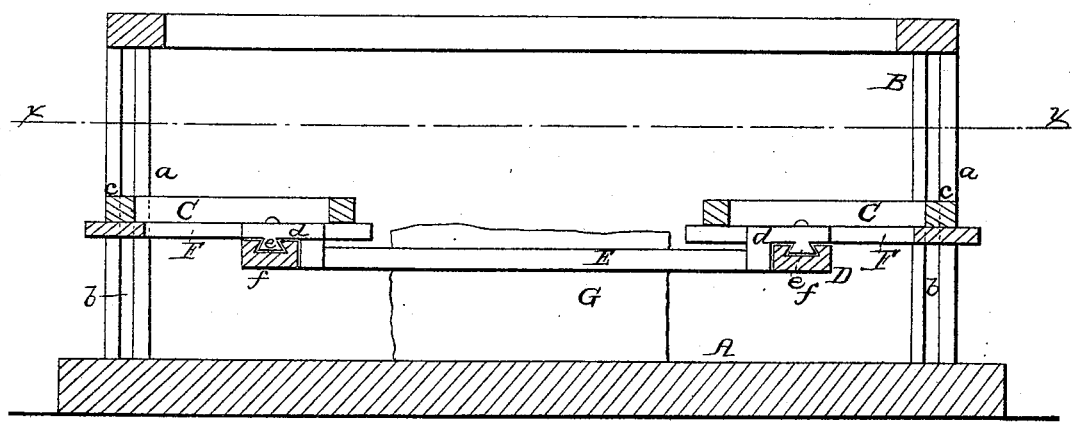
Figure 2:
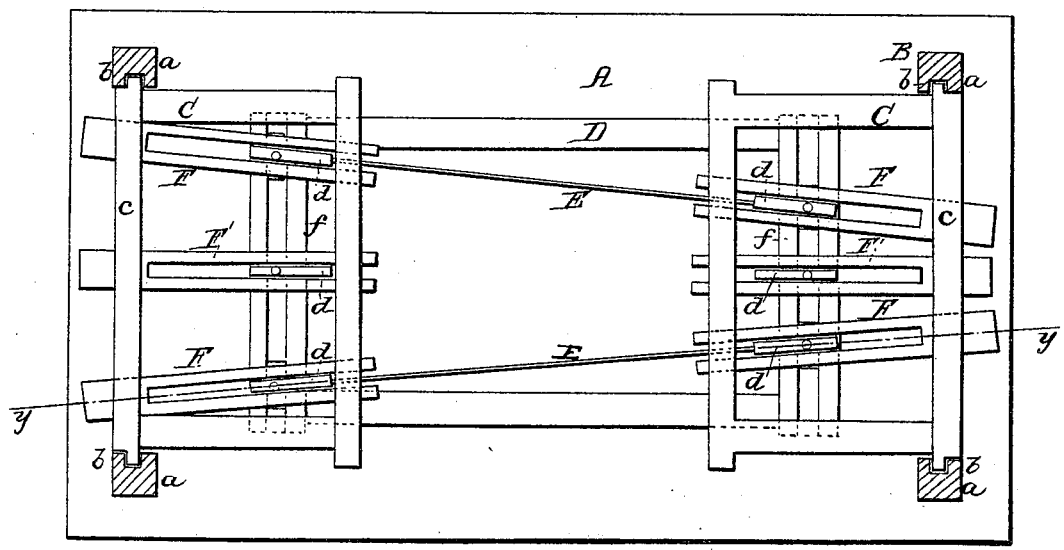

Figure 1 is a longitudinal vertical section of my improvement, the plane of section being shown by the line $y\ y$, Fig. 2. Fig. 2 is a plan or top view of the same, the framing being bisected horizontally, as indicated by the line $x\ x$, Fig. 2.

Similar letters of reference indicate corresponding parts in the two figures.

The nature of my invention consists in the peculiar construction of adjustable and permanent guides to be used in machines for sawing stone and marble, as will be presently shown and described.

To enable others skilled in the art to make and use my invention, I will proceed to describe its construction and operation.

A represents a bed-plate, on which a rectangular framing B is placed. The uprights $a$ of the framing have vertical grooves $b$ cut in their inner sides, in which grooves the ends of outer cross-pieces $c$ of frames C C fit, said frames being allowed to work freely up and down within the grooves. The inner ends of the frames C C rest upon a saw sash or frame D, in which the saws E are placed, the ends of the saws having projections or cleats $d$ attached to them, the under sides of said cleats or projections having dovetails $e$ upon them, which dovetails fit and work in correspondingly-shaped grooves in the end pieces $f$ of the saw sash or frame D.

The frames C C have guides F F′ attached to them, three guides to each frame, and the projections or cleats $d$ fit between or in the guides. The guides F F are placed in a horizontal position and are formed by slotted bars, the slots being equal or rather exceeding the length of the stroke of the saw-frame. The center guides F F in the frames C at each end of the framing B are permanently secured in the frames C C and parallel with the sides of the framing B; but the guides F at each side of the center or permanent guides F′ are adjustable, so that they may be placed more or less obliquely with the guides F′.

The center guides F′ serve to keep the saw sash or frame D in proper position, or so as to work back and forth in a right line. The center guides F′ of each frame C, therefore, are in line with each other, as clearly shown in Fig. 2. The other guides F are placed more or less obliquely with each other, so as to give the saws E an oblique position with each other, as shown in Fig. 2. The block of marble G to be sawed is placed upon the platform A, the saw sash or frame D being previously raised, so that the block G may be placed underneath it. A reciprocating motion is then given the saw sash or frame D in any proper manner, and the center guides F′ and center projections or cleats $d$ keep the saw sash or frame D working in a right line, the center cleats being permanently attached to the end pieces $f$ of the sash or frame D, while the oblique guides will move laterally the saws E and cause them to cut the two sides of the block G in taper form, the quickness of the taper or the degree of obliquity of the sides of course corresponding to the position in which the guides F are set. These guides are attached to the frames C C by set-screws, so that they may be readily adjusted. The saw feeds itself to its work by its own weight or gravity, the frame C following the saw, and when the two sides of the block are sawed the block is reversed upon the bed-plate A, properly "blocked up," and the remaining two sides cut in a similar manner to the first two. A saw may be attached to the center projections or cleats $d$, if desired, for the purpose of sawing a straight cut or one in a right line with the movement of the saw-frame D.

By constructing the guides as herein shown the saw-frame D is kept in place while working with a reciprocating motion back and forth, and the saws are moved laterally while the saw-frame is working longitudinally.

The improvement is simple, durable, not liable to get out of repair, and will operate well in practice.

Having thus described my invention, what I claim as new, and desire to secure by Letters Patent, is—

Constructing the adjustable guides F and permanent guides F′ of stone-sawing machines, as shown and set forth.

GEO. W. HUBBARD.

Witnesses:
JOS. GEO. MASON,
WM. TUSCH.